United States Patent [19]

Reynolds et al.

[11] Patent Number: 5,537,688
[45] Date of Patent: Jul. 23, 1996

[54] HAND COVERING WITH VIBRATION-REDUCING BLADDER

[75] Inventors: Douglas D. Reynolds, Las Vegas, Nev.; Thomas C. Jetzer, Edina, Minn.

[73] Assignee: ErgoAir, Inc., Las Vegas, Nev.

[21] Appl. No.: 367,468

[22] Filed: Dec. 30, 1994

[51] Int. Cl.⁶ .................................................. A41D 13/00
[52] U.S. Cl. ............................ 2/20; 2/161.6; 2/904; 2/910
[58] Field of Search ................................. 2/16, 20, 159, 2/161.1, 161.6, DIG. 3, 910, 917, 904

[56] References Cited

U.S. PATENT DOCUMENTS

| | | |
|---|---|---|
| 4,471,538 | 9/1984 | Pomeranz et al. |
| 4,478,408 | 10/1984 | Bruckner. |
| 4,509,228 | 4/1985 | Landsberger. |
| 4,545,841 | 10/1985 | Jackrel. |
| 4,559,646 | 12/1985 | Eril ........................................ 2/169 X |
| 4,820,090 | 4/1989 | Chen. |
| 4,918,754 | 4/1990 | Leatherman et al. |
| 4,942,791 | 7/1990 | Stewart et al. |
| 5,157,807 | 10/1992 | Keller et al. |
| 5,193,246 | 3/1993 | Huang. |
| 5,195,212 | 3/1993 | Colwell. |
| 5,274,846 | 1/1994 | Kolsky ..................................... 2/16 X |
| 5,345,609 | 9/1994 | Fabry et al. ............................ 2/20 |

FOREIGN PATENT DOCUMENTS

| | | | |
|---|---|---|---|
| 333946 | 12/1903 | France ....................................... 2/16 |
| 1764615 | 9/1992 | Russian Federation .................. 2/16 |
| 1818058 | 5/1993 | Russian Federation .................. 2/16 |
| 961646 | 9/1982 | U.S.S.R. ................................... 2/16 |
| 1623590 | 1/1991 | U.S.S.R. ................................... 2/16 |
| 1651831 | 5/1991 | U.S.S.R. ................................... 2/16 |

*Primary Examiner*—Paul C. Lewis
*Attorney, Agent, or Firm*—Kinney & Lange

[57] ABSTRACT

An air isolation hand covering has a bladder consisting of a plurality of interconnected or independent inflation cells that is positioned between the hand and a hand-held tool or other vibrating object. The cells are oriented to permit easy bending of the hand covering in directions appropriate for grasping an object. The effectiveness of the bladder in reducing the vibration energy transmitted to the hand is a function of the shape and configuration of the bladder, the pressure in the bladder, the compressible fluid used, the volume of the bladder, and the grip force and push force used when clasping a tool or other object. The bladder can be filled with air or other fluid during the fabrication of the bladder or it can be inflated or deflated with a small pump and integral air valve connected to one of the air cavities.

15 Claims, 7 Drawing Sheets

HAND COVERING WITH VIBRATION-REDUCING BLADDER

BACKGROUND OF THE INVENTION

Many individuals are exposed to hand-induced vibration by using hand-held vibrating or repeated impact-type tools that include, but are not limited to, chipping hammers, jackhammers, riveters, jackleg drills, rotary grinders and sanders, orbital sanders, chain saws, lawn mowers, and engine-powered string trimmers. Individuals can also be exposed to hand-induced vibration through clasping objects in their hands that are being ground, swagged, or repeatedly hammered. Finally, individuals can be exposed to hand-induced vibration while riding motor cycles, motor bikes, all-terrain vehicles, and other like vehicles.

Individuals who are exposed to hand-induced vibration or repetitive impacts over short periods of time can experience tingling and numbness in the fingers and hand fatigue. If individuals are exposed to high levels of hand-induced vibration over prolong periods of time, vibration-induced white fingers (VWF) can develop. This disease results in a destruction of the small blood vessels in the fingers, and it can be debilitating and cause severe pain in extreme cases. The occurrence of tingling, numbness and fatigue in the hand and fingers and of VWF can be minimized by reducing the levels of vibration energy directed into the hands of individuals who use vibrating or repeated impact-type hand tools or who clasp objects that direct vibration or repetitive impacts into the hand.

Vibration levels can be reduced by redesigning the tool or object or by placing a vibration isolation device between the hand and the tool or object that is being clasped by the hand. One of the methods for reducing the vibration energy directed into the hands has been the use of gloves that have an elastomer, foam or rubberlike material placed between the vibrating tool or object and the hand. Hand coverings such as gloves made with elastomers or rubberlike materials have proven to be ineffective in significantly reducing the vibration energy transmitted to hands from vibrating hand tools or objects clasped by the hand. To improve the vibration isolation characteristics of gloves with elastomers or rubberlike materials, it is necessary to make the elastomer or rubber pads used in the gloves very thick. This often makes the glove stiff and very difficult to use in clasping a hand tool or other object. Also, using gloves with thick elastomer or rubber pads causes the hands to become fatigued in a very short period of time.

The occurrence of VWF is significantly affected by a cold environment. VWF is more prevalent in areas where workers must work either outside or inside in a cold environment. Gloves are often used in these environments to warm the hands, reducing the effects of cold on the prevalence of VWF in these environments. Using gloves with elastomer or rubberlike pads that are also designed to keep the hands warm creates the same problems that are associated with gloves that have extremely thick elastomer or rubberlike pads. The gloves tend to be stiff and often make it difficult to easily clasp a hand tool or other object.

Accordingly, hand coverings are desired which will more effectively reduce the vibration transmitted to the hand from the hand-held object, and will furthermore be thin, flexible, thermally insulative and relatively inexpensive.

SUMMARY OF THE INVENTION

The problems associated with hand coverings that contain elastomer or rubberlike pads are solved with the air isolation hand coverings of the present invention. The air isolation hand coverings contain a bladder to be filled with air or other compressible fluid. The bladder consists of a plurality of interconnected or independent inflation cells, and is located in the hand coverings such that it will be placed between the hands and a tool or other object when the hands clasp the object.

BRIEF DESCRIPTION OF THE DRAWINGS

FIG. 2-1 is a plan view of a first embodiment of the air isolation hand covering of the present invention showing the bladder configuration.

FIG. 2—2 is a cross-sectional view of the first embodiment of the air isolation hand covering taken along line 2—2 in FIG. 2-1.

FIG. 3-1 is a plan view of a second embodiment of the air isolation hand covering of the present invention showing the bladder configuration.

FIG. 3-2 is a cross-sectional view of the second embodiment of the air isolation hand covering taken along line 3—3 in FIG. 3-1.

FIG. 4-1 is a plan view of a third embodiment of the air isolation hand covering of the present invention showing the bladder configuration.

FIG. 4-2 is a cross-sectional view of the third embodiment of the air isolation hand covering taken along line 4—4 in FIG. 4-1.

FIG. 5-1 is a plan view of a fourth embodiment of the air isolation hand covering of the present invention showing the bladder configuration.

FIG. 5-2 is a cross-sectional view of the fourth embodiment of the air isolation hand covering taken along line 5—5 in FIG. 5-1.

FIG. 6-1 is a plan view of a fifth embodiment of the air isolation hand covering of the present invention showing the bladder configuration.

FIG. 6-2 is a cross-sectional view of the third embodiment of the air isolation hand covering taken along line 6—6 in FIG. 6-1.

While the above-identified drawing figures set forth alternative embodiments, other embodiments of the present invention are also contemplated, some of which are noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The present invention is a hand covering which uses a bladder inflated with a compressible fluid to reduce vibration transmission through the hand covering, and further provide substantial thermal insulation benefits. While further discussion of the invention will refer to "air" as the compressible fluid being used, workers skilled in the art will recognize that any compressible fluid could be substituted for air within the spirit of the invention.

Figure 1:
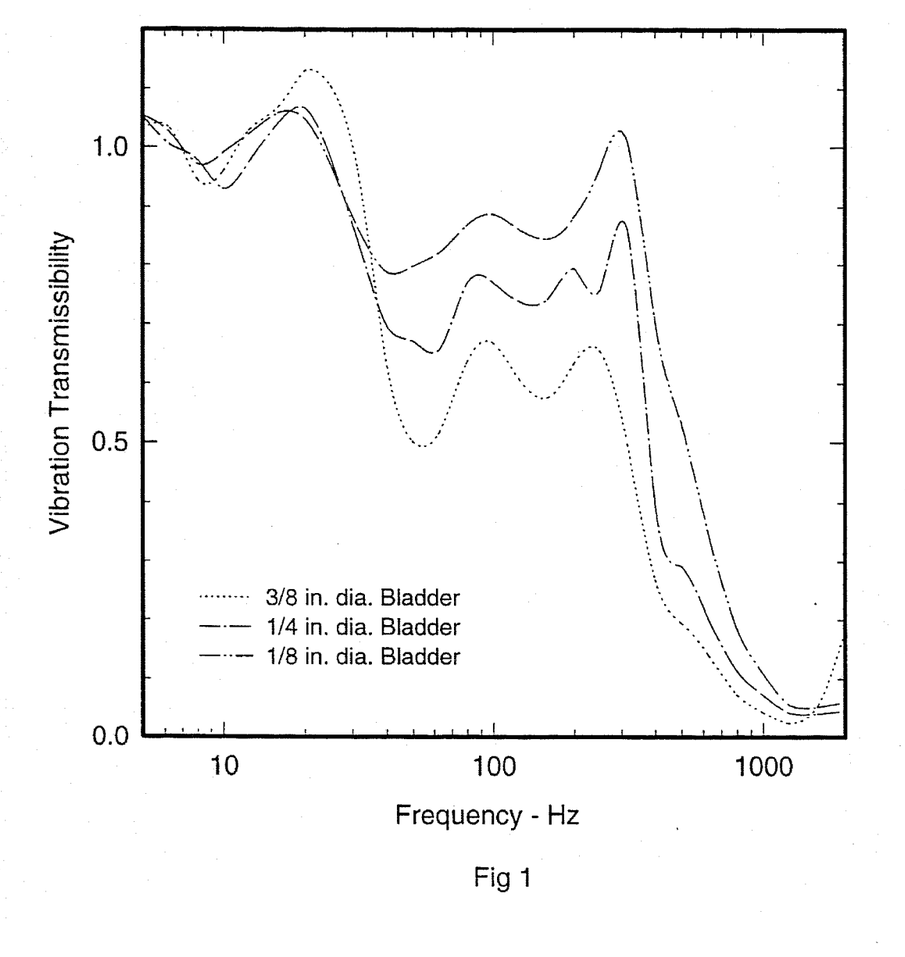
FIG. 1 is a plot of the vibration transmissibility of three different air bladder configurations.

The effectiveness of an air isolation bladder in reducing vibration energy directed into the hand is illustrated in FIG. 1. FIG. 1 shows tested vibration transmissibility values as a function of vibration frequency for three different air bladder configurations. Each of the air bladder configurations consist of a plurality of interconnected air cells, similar to those shown in FIGS. 2–6. The tested bladders had cells diameters of ⅛ in. (3.2 mm), ¼ in. (6.4 mm), and ⅜ in. (9.5 mm), respectively, and were inflated to pressures of about 15–25 psi. The larger the diameter of the plurality of interconnected air cavities in the bladder, the greater the air volume of the inflated bladder. The vibration transmissibility in FIG. 1 is the ratio of the vibration amplitude directed into the hand divided by the vibration amplitude incident on the surface of the air bladder.

Figures 21, 22:
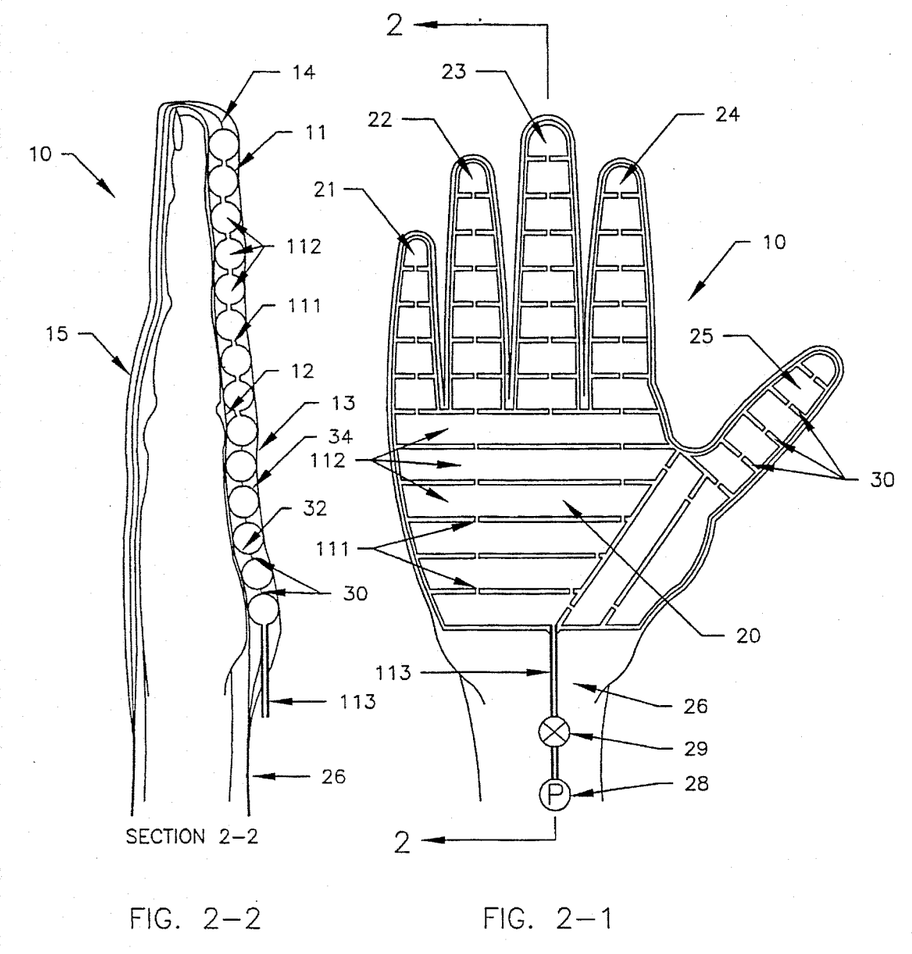

The first embodiment of an air isolation hand covering of the present invention is shown in FIG. 2. Glove 10 consists of a palm portion 20, finger stalls 21, 22, 23 and 24, a thumb stall 25, and a gauntlet 26. The air isolation glove has an inner liner 12 that is cut and formed into a hand covering structure. The inner liner is of a soft, moisture-absorbing material, such as cotton or other like material, for comfort when placed against a user's palm. The outer covering layer 13 is of a protective, wear-resistant material such as leather, cloth or other like material. Placed between the inner liner 12 and the outer covering layer 13 in the inside palm portion 20 and finger and thumb stalls 21, 22, 23, 24, and 25 is an air bladder 11. If desired the material 14 of the air bladder 11 may extend to the back side 15 of the glove 10.

Air bladder 11 includes a plurality of air cavities or cells 112. Cells 112 are defined by cell divisions 30, where the inner layer 32 and outer layer 34 of bladder 11 are joined. Air bladder 11 may be made of any flexible, air-tight material. The air bladder 11 is preferably made from two layers of thermal plastic. Depending on the material of air bladder 11, cell divisions 30 may be formed by adhesive, by application of heat and/or pressure to join the material of bladder 11, or by other processes. It is preferred that cell divisions 30 be as narrow as possible, such that inner layer 32 generally defines a flat surface adjacent the hand and outer layer 34 generally defines a flat surface facing outward from the hand. The material of air bladder 11 should generally be inelastic, such that little or no deformation of cells 112 occurs at inflation pressure.

Cells 112 are linear, and are generally arranged in a planar configuration to cover the surface of palm portion 20, finger stalls 21, 22, 23 and 24, and thumb stall 25. Cells 112 may not entirely cover these surfaces. For instance, only 50% of the palm portion 20 may be covered. Similarly, cells 112 may not cover one or more of these surfaces at all. For instance, it may not be necessary to cover finger stalls 21, 22, 23 and 24. However, substantial coverage is desired for all portions of the hand that will contact the vibrating object.

For many applications, it is unnecessary to include any cells 112 on the back side 15 of the glove 10. However, cells 112 provide significant thermal insulation for the hand, and it may be desired to include cells 112 on the back side 15 of the glove 10 for applications in cold environments.

The cross-sectional shapes of the air cells 112 can be circular as shown in FIG. 2—2. The cross-sectional shape of the air cells 112 may also be triangular, square, hexagonal, octagonal, etc. The air bladder cavities 112 in the palm portion 20 and the finger and thumb stalls 21, 22, 23, 24 and 25 can have the same cavity cross-sectional shape (circular, triangular, square, hexagonal, octagonal, etc.) or can have a mixture of cavity cross-sectional shapes (circular, triangular, square, hexagonal, octagonal, etc.). The cross-sectional dimensions of the air bladder cavities in the palm portion 20 and the finger and thumb stalls 21, 22, 23, 24 and 25 can all be the same or they can be different. The cross-sectional shapes and related dimensions of the air cavities in the palm portion 20 and the finger and thumb stalls 21, 22, 23, 24 and 25 can be varied to permit the air isolation glove to be configured to accommodate different glove applications.

The cells 112 may be interconnected through air passages 111 or may be independent. If the cells 112 are independent, they do not communicate with each other and they each have a certain pressure. Independent air cells 112 will generally be inflated during manufacture of glove 10.

If the air cavities are interconnected, they can be made to communicate with each other through small air passages 111 that are molded into the bladder. This fluid communication allows bladder 11 to be inflated and deflated from a single source after manufacture of glove 10. The air passages 111 can be small orifices between layers 32, 34 that allow adjacent air cavities 112 to communicate. Air passages 111 can be small elastic tubes placed between adjacent air cavities 112, that allow them to communicate with each other. The connection of adjacent cells 112 by air passages 111 can allow the air pressure in the plurality of interconnected air cavities 112 to equalize as the glove 10 clasps a tool handle or other object. Alternatively, air passages 111 may be formed so as to close when glove 10 is flexed or curled about a tool handle or other object. These closing air passages 111 allow inflation and deflation of bladder 11 from a single source, but do not allow fluid communication between adjacent cells 112 during use.

Adjacent cells 112 can be parallel to each other or they can be oriented at differing angles relative to each other, as is show in FIG. 2-1 where the thumb stall 25 is connected to the palm portion 20. During inflation, cells 112 will resist bending or flexing, but cell divisions 30 will provide joints which allow bending between cells 112. The orientation of cells 112 and cell divisions 30 can generally be chosen to allow more easy flexing of glove 10 for its intended use. In the configuration shown, cell divisions 30 allow ready downward curling of finger stalls 21, 22, 23 and 24. Cell divisions 30 also allow ready bending of thumb stall 25 diagonally inward, and allow ready opposable bending between the thumb stall 25 and palm portion 20.

If the air cavities 112 are interconnected, the air bladder 11 can be filled through a small hollow tube 113 attached to the endmost air cavity of the palm section 20 or to any other air cavity. The air bladder 11 can also be inflated with a small manual pump 28 (shown schematically) attached to the hollow tube 113. A check and air-release valve 29 (shown schematically) attached between the small manual pump 28 and the hollow tube 113 can be used to adjust the interior air pressure in the air bladder 11. Regardless of whether cells 112 are independent or interconnected, bladder 11 may also be inflated and completely sealed during manufacture having a certain interior air pressure. If bladder 11 is completely sealed, it would not be necessary to provide any inflating valve or pump.

Figures 31, 32:
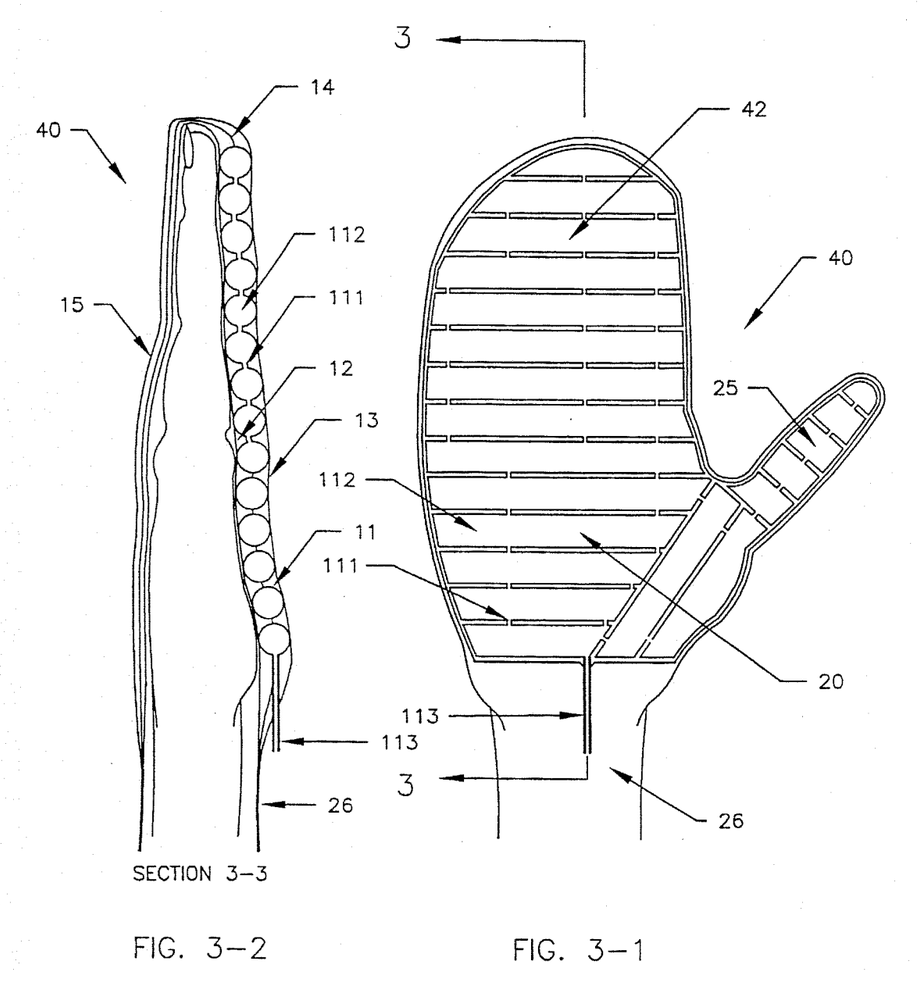

A second embodiment of the air isolation hand covering is shown in FIG. 3. Mitten 40 consists of a palm portion 20, a finger portion 42, a thumb stall 25, and a gauntlet 26. With the exception of the difference between the finger portion 42 of the second embodiment of the present invention and the finger stalls 21, 22, 23 and 24 of the first embodiment of the present invention, the construction of the second embodiment of the present invention is the same as the first.

Figures 41, 42:
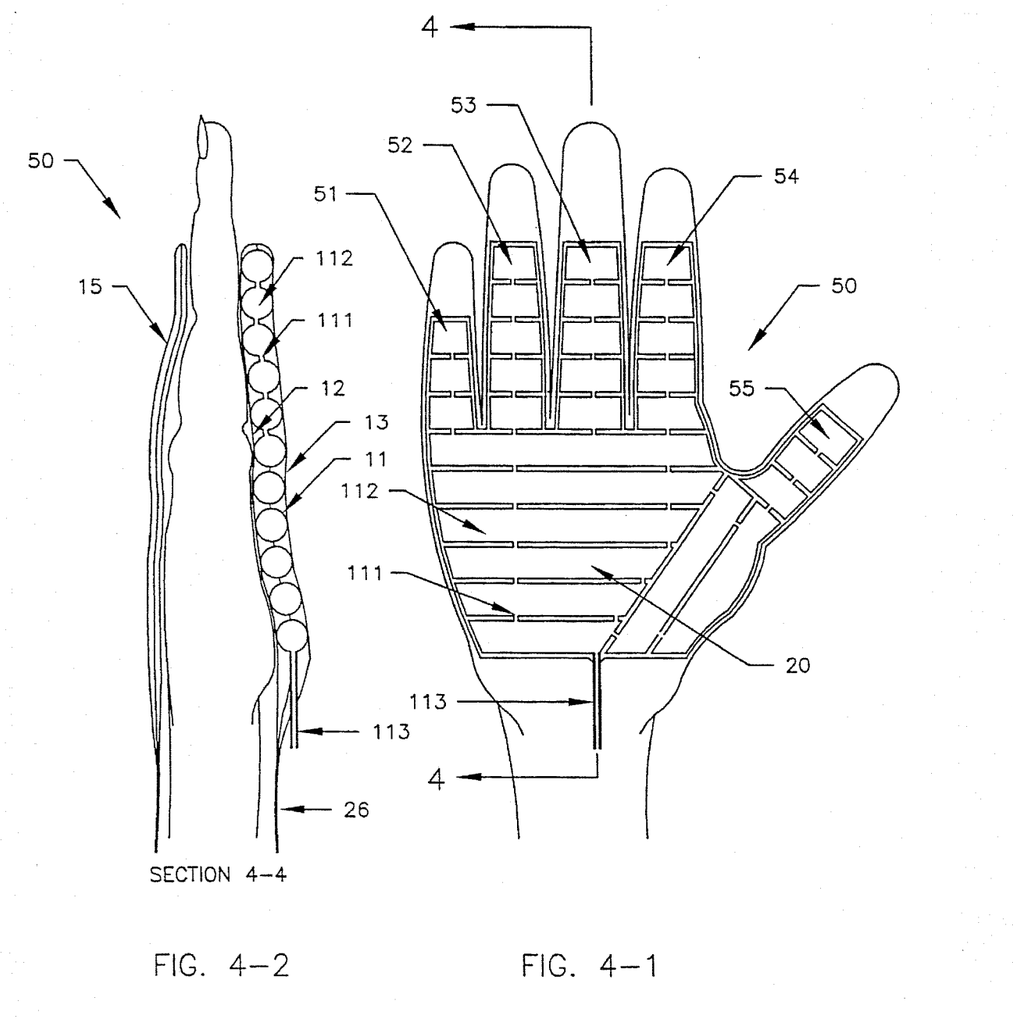

A third embodiment of the air isolation hand covering is shown in FIG. 4. Glove 50 consists of a palm portion 20, finger stalls 51, 52, 53 and 54, a thumb stall 55, and a gauntlet 26. The construction of the third embodiment of the present invention is the same as the first embodiment of the present invention with the exception the finger stalls 21, 22, 23 and 24 and the thumb stall 25 are shortened and left open so that the fingers and thumb can extend exposed through the ends of the finger stalls 51, 52, 53 and 54 and the thumb stall 55.

Figures 51, 52:
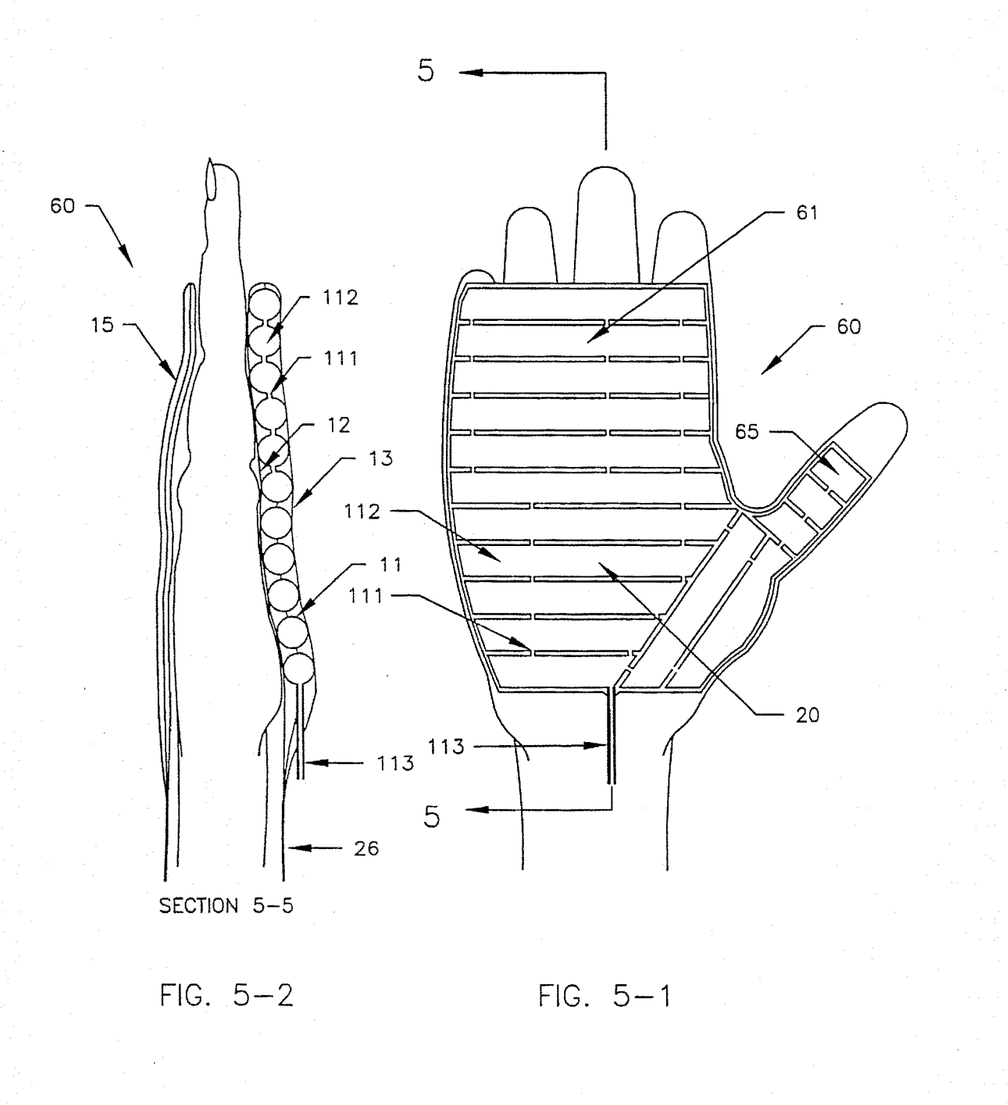

A fourth embodiment of the air isolation hand covering is shown in FIG. 5, Mitten 60 consists of a palm portion 20, a finger portion 61, a thumb stall 65, and a gauntlet 26. The construction of the forth embodiment of the present invention is the same as the second embodiment of the present invention with the exception the finger portion 42 and the thumb stall 25 are shortened and left open so that the fingers and thumb can extend exposed through the ends of the finger portion 61 and the thumb stall 65.

Figure 61:
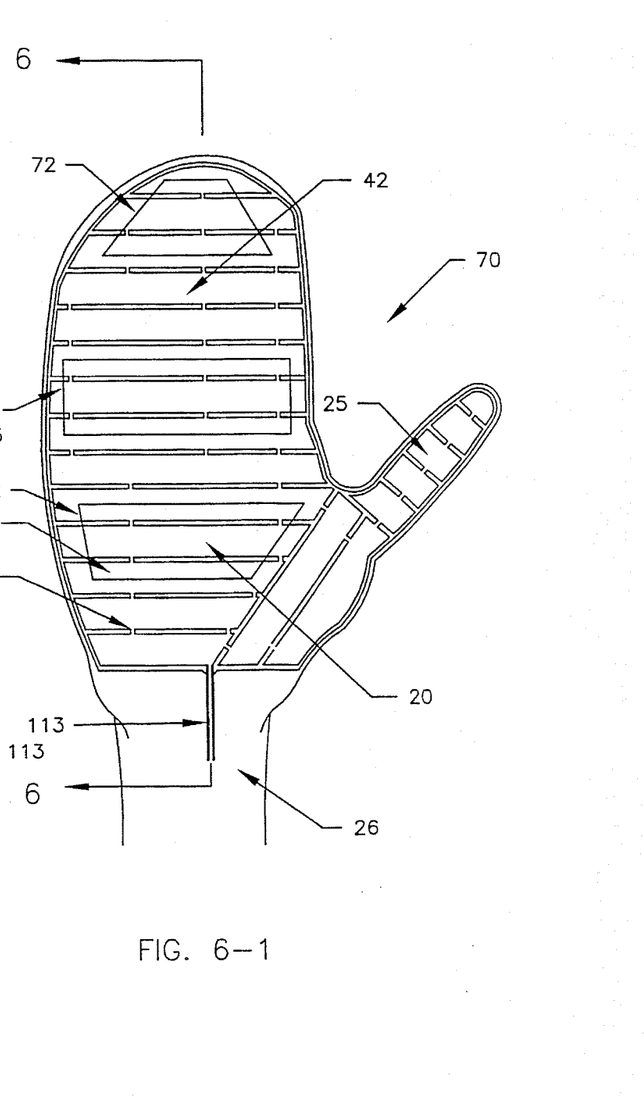
Figure 62:
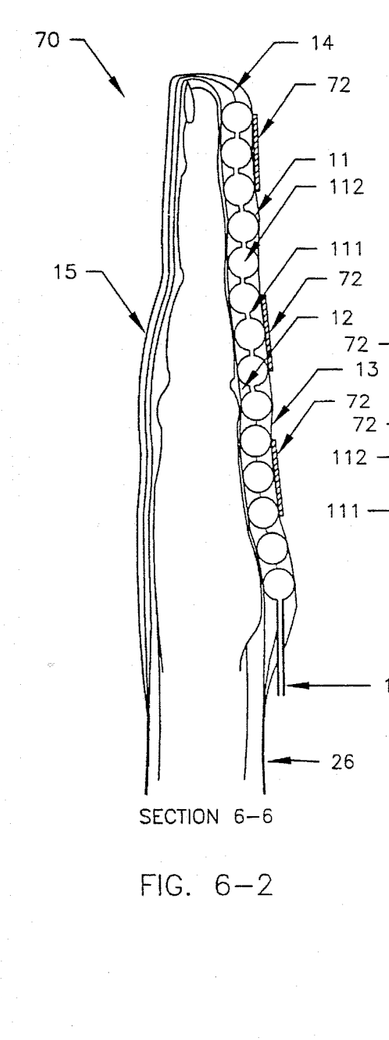

A fifth embodiment of the air isolation hand covering is shown in FIG. 6. Mitten 70 consists of a palm portion 20, a finger portion 42, a thumb stall 25, and a gauntlet 26. The construction of the fifth embodiment of the present invention is the same as the second embodiment of the present invention with the following exception. Lubricating strips 72 can be attached to the palm portion 20 and the finger portion 42 of the mitten. Lubricating strips 72 may be thin solid strips of teflon or other like material.

Lubricating strips 72 allow mitten 70 to slide relative to a vibrating hand-held object, such that the only vibrating forces which are substantially transmitted to mitten 70 are those normal to the grasping surface. Vibratory shear forces are not substantially transmitted to mitten 70, thus increasing the effectiveness of mitten 70. This embodiment is particularly useful for applications where the hands are used primarily to push a vibrating object that has substantial vibration motion tangent to the palm and finger surfaces of the mitten.

Figure 7:
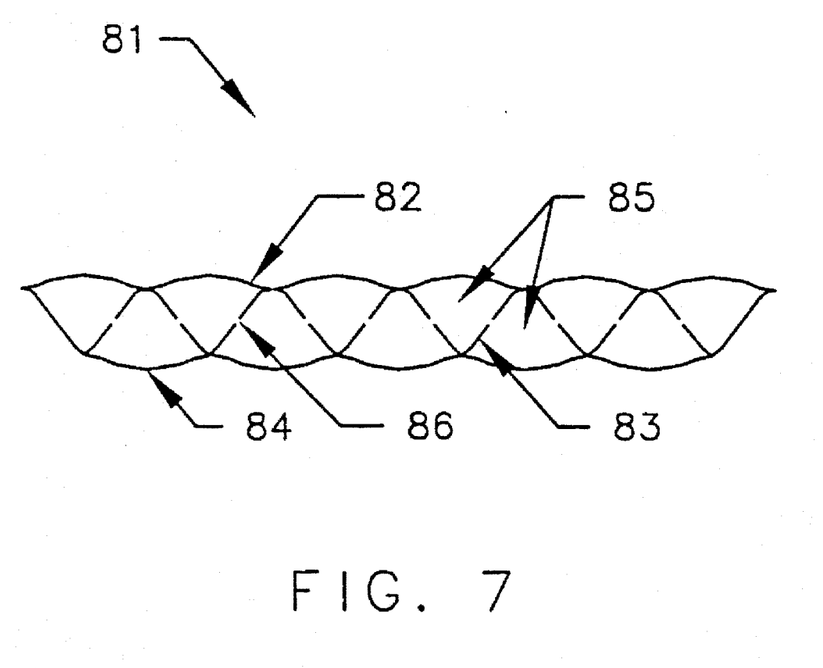
FIG. 7 is a cross-sectional view of a three-layer air bladder configuration with two adjacent rows of air cells.

The air bladders 11 in the five embodiments of the present invention show in FIGS. 2–7 are composed of a single layer of air cells 112. Alternatively, as shown in FIG. 7, the air bladders 11 in the five embodiments of the present invention can include two adjacent layers of air cells 85. The air bladder 81 in FIG. 7 can be made from three layers 82, 83 and 84 of thermal plastic or other similar material that are bonded together. The three layers 82, 83 and 84 can be bonded together to form air cells 85 cross-sectional shapes that are circular, triangular, square, hexagonal, octagonal, etc. If interconnection of adjacent cells 85 is desired, small orifices in the middle layer 83 can be used to allow air cells 85 to communicate with each other.

The air bladders described in these preferred embodiments of FIGS. 2–7 serve as an air spring which is very effective in reducing vibration or impact energy transmitted to the hand. Referring back to FIG. 1, the vibration transmissibility curves illustrate several characteristics of the use of an air isolation bladder to reduce the vibration energy transmitted to the hand. Firstly, the effectiveness of the air isolation bladder in reducing vibration energy directed into the hand generally increases as the thickness of the air in the bladder increases. The ⅜ in. diameter bladder was generally most effective, while the ⅛ in. diameter bladder was generally least effective. It is believed that this difference is due to a greater volume of air in the larger diameter bladder, allowing a larger attenuation of vibration energy during air compression and expansion.

Secondly, the effectiveness of the air isolation bladder is related to the frequency of the vibrations. The air isolation bladders tested were very effective at reducing vibration energy at frequencies over 40 Hz (the effectiveness increased with increasing diameter of the air bladder cells). The air bladder was even more effective in reducing vibration energy at frequencies above 400 Hz. Conversely, the air isolation bladders tested were not generally effective at reducing vibration energy at a frequency of less than 20–30 Hz. It is believe that the beneficial effect to the air isolation bladder is related to the time delay which occurs for air compression forces to be transmitted through the air cells. That is, air within the cell will not compress uniformly during each vibration cycle. Rather, force is transmitted through the air cell in a compression or sound wave, which does not travel instantaneously and does not compress air uniformly within the cell. It is believed that the compression energy of higher frequency vibrations is not effectively transmitted prior to the next vibration cycle, and thus high frequency energy is more effectively dissipated by the air isolation bladders. For lower frequency vibrations, it is believed that more of the compression energy is transmitted prior to the next vibration cycle, and thus the air isolation bladder does not work as effectively at lower frequencies.

Thirdly, each of the tested bladders had particular points of reduced relative effectiveness (i.e., vibration transmissibility peaks) at frequencies of around 20 and 300 Hz. It is believed that the bladders have harmonic frequencies and that resonances are achieved at around 20 and 300 Hz.

It is believed that all of the particular values for vibration transmissibility are dependant upon the particular configuration of the air isolation bladder tested, but that similar characteristics would be observed in all isolation bladders. For instance, a bladder using a different arrangement of cells, a different inflation pressure or a different compressible fluid might be very effective at frequencies over 100 Hz, have a resonance frequency around 50 Hz, and be generally ineffective at frequencies less than 2–3 Hz.

The use of an air bladder to reduce the transmission of vibration and impact energy directed into the hand provides numerous benefits over prior art elastomeric, foam or rubber filled gloves. In particular, the air isolation hand covering has the following properties and functions:

1. The air isolation hand covering has vibration isolation properties that are determined by the shape and configuration of the air bladder, the pressure in the bladder, the volume of the bladder, the compressible fluid used, and the grip force and push force used when clasping a tool or other object. Each of these parameters can be modified as desired for maximum vibration isolation for the particular use contemplated.

2. The air isolation hand covering can be designed with sufficient air volume and air pressure in the air bladder so that the bladder will always maintain an air layer between the hand and tool or other object, irrespective of the grip and push forces employed during the operation associated with using the tool or other similar device.

3. The air bladder in the air isolation hand covering can be filled with air during fabrication of the bladder, or it can be inflated or deflated by means of a small air pump and integral check and air-release valve connected to one of the air cavities of the bladder.

4. If the air bladder in the air isolation hand covering is inflated by means of a small air pump and integral check and air-release value connected to one of the air cavities of the bladder, the air pressure in the air bladder can be controlled to adapt to the different needs of the wearers of the air isolation hand covering.

5. The air isolation hand covering is a lightweight glove that is comfortable to wear and that easily conforms to the different shapes of tool handles and other objects that may by clasped with the gloves. This significantly reduces the hand fatigue that is often associated with gloves that contain elastomer or rubberlike vibration isolation pads.

6. The thermal plastic or other flexible material used to construct the air bladder in the air isolation hand covering can also be used to completely enclose the fingers and palm of the hand, providing effective lightweight thermal insulation to keep the hand warm.

7. By significantly reducing the vibration energy that is directed into the hand, the air isolation hand covering can significantly reduce the tingle and numbness in the fingers and the hand fatigue that is experienced, when clasping vibrating hand tools or other vibrating objects.

8. By significantly reducing the vibration energy that is directed into the hand, the air isolation hand covering can significantly reduce the incidence of VWF in worker populations or significantly increase the time period before symptoms associated with VWF begin to appear in worker populations.

9. By significantly reducing the vibration energy that is directed into the hand, the air isolation hand covering can significantly reduce the discomfort that is associated with working with vibrating hand tools or holding onto vibrating objects.

Although the present invention has been described with reference to preferred embodiments, workers skilled in the art will recognize that changes may be made in form and detail without departing from the spirit and scope of the invention.

What is claimed is:

1. A hand covering for reducing vibration from being transmitted to a user's hand from a hand-held object, the hand covering comprising:

a bladder defining a fluid cavity and made of a fluid-impervious material for covering a user's hand, the bladder having a first side for placement against a user's hand and a second side for placement away from a user's hand, the bladder being adapted to retain compressible fluid, the bladder comprising:

a first layer of air-tight material, a second layer of air-tight material, and an intermediate layer of air-tight material between the first layer and the second layer, the intermediate layer being bonded to the first layer at discreet divisions which define a plurality of inflation cells between the first layer and the intermediate layer, and the intermediate layer being bonded to the second layer at discreet divisions which define a plurality of inflation cells between the second layer and the intermediate layer wherein the plurality of inflation cells between the first layer and the intermediate layer and the plurality of inflation cells between the second layer and the intermediate layer are interconnected by passages so as to allow inflation from a single source; and a backing attached to the bladder for releasably attaching the bladder to a user's hand.

2. The hand covering of claim 1, wherein passages between the plurality of inflation cells close upon flexing of the hand covering.

3. The hand covering of claim 1, wherein passages between the plurality of inflation cells remain open upon flexing of the hand covering, retaining fluid communication between inflation cells during flexing of the hand covering.

4. The hand covering of claim 1, wherein the bladder is made of an inelastic plastic material.

5. The hand covering of claim 1, further comprising:

a palm lining attached to the first side of the bladder to separate the bladder from a palm of a user's hand, the palm lining being made of a soft, moisture absorbing material.

6. The hand covering of claim 1, further comprising:

a wear material attached to the second side of the bladder to protect the bladder from wear against a hand-held object.

7. The hand covering of claim 1, further comprising:

a pump for inflating the bladder, and a release valve for releasing compressible fluid from within the bladder.

8. The hand covering of claim 1, wherein the bladder defines separate finger stalls, and the backing and the bladder together make up a glove.

9. The hand covering of claim 1, wherein the bladder comprises:

a palm portion including a plurality of inflation cells aligned with an orientation to allow flexing of the bladder during inflation in general conformance to flexing of a user's palm and fingers; and a thumb portion including a plurality of inflation cells aligned with an orientation different from the orientation of the plurality of inflation cells of the palm portion to allow flexing of the bladder during inflation in general conformance to flexing of a user's thumb, wherein the plurality of inflation cells of the palm portion and the plurality of inflation cells of the thumb portion are interconnected by passages so as to allow inflation from a single source.

10. The hand covering of claim 9, wherein a separation is defined between the plurality of inflation cells of the palm portion and the plurality of inflation cells of the thumb portion, the separation being oriented to facilitate opposable flexing of the thumb portion with respect to the palm portion.

11. The hand covering of claim 10, wherein the plurality of inflation cells of the thumb portion define a joint within the thumb portion, the joint being oriented different from the orientation of the separation to facilitate curled flexing of the thumb portion.

12. The hand covering of claim 9, wherein the plurality of inflation cells of the palm portion define a finger portion and a joint, the joint being oriented to facilitate flexing of the finger portion.

13. The hand covering of claim 12, wherein the plurality of inflation cells of the palm portion define a plurality of joints within the finger portion, the joints being oriented to facilitate curled flexing of the finger portion.

14. A hand covering for reducing vibration from being transmitted to a user's hand from a hand-held object, the hand covering comprising:

a bladder defining a fluid cavity and made of a fluid-impervious material for covering the palm of a user's hand, the bladder having a first side for placement against the palm of a user's hand and a second side for placement away from the palm of a user's hand, the bladder being adapted to retain compressible fluid, the bladder including a plurality of inflation cells to allow flexing of the bladder during inflation in general conformance to flexing of a user's hand;

a backing attached to the bladder for releasably attaching the bladder to the palm of a user's hand; and a lubricant material attached to the second side of the bladder to alleviate transmittal of shear forces between a hand-held object and the bladder.

15. A hand covering for reducing vibration from being transmitted to a user's hand from a hand-held object, the hand covering comprising:

a bladder defining a fluid cavity and made of a fluid-impervious material for covering the palm and thumb of a user's hand, the bladder having a first side for placement against the palm and thumb of a user's hand and a second side for placement away from the palm and thumb of a user's hand, the bladder being adapted to retain compressible fluid, the bladder comprising a palm portion including a plurality of inflation cells, the plurality of inflation cells of the palm portion being aligned with an orientation to allow flexing of the bladder during inflation in general conformance to flexing of a user's palm and fingers, the bladder further comprising a thumb portion including a plurality of aligned inflation cells, the plurality of inflation cells of the thumb portion being aligned with an orientation different from the orientation of the plurality of inflation cells of the palm portion to allow flexing of the bladder during inflation in general conformance to flexing of a user's thumb, wherein the plurality of inflation cells over the palm portion and the plurality of inflation cells over the thumb portion are interconnected by passages so as to allow inflation from a single source, wherein the bladder comprises:

a first layer of air-tight material, a second layer of air-tight material, and an intermediate layer of air-tight material between the first layer and the second layer, the intermediate layer being bonded to the first layer at discreet divisions which define a plurality of inflation cells between the first layer and the intermediate layer, and the intermediate layer being bonded to the second layer at discreet divisions which define a plurality of inflation cells between the second layer and the intermediate layer; and a backing attached to the bladder for releasably attaching the bladder to the palm of a user's hand.

* * * * *